Nov. 12, 1935.   A. A. SMALLHOUSE   2,021,026

CIRCULAR TYPE WASH RACK OR LAUNDRY

Original Filed Nov. 14, 1927

INVENTOR.
Albert A. Smallhouse,
BY
ATTORNEYS.

Patented Nov. 12, 1935

2,021,026

UNITED STATES PATENT OFFICE 2,021,026

CIRCULAR TYPE WASH RACK OR LAUNDRY

Albert A. Smallhouse, Los Angeles, Calif., assignor to Gillespie Auto Laundry System, Inc., Chicago, Ill., a corporation of Delaware Original application November 14, 1927, Serial No. 233,245. Divided and this application March 6, 1929, Serial No. 344,767

6 Claims. (Cl. 104—172)

My invention relates to automobile wash racks, and the subject matter of the present application is a division from application Serial No. 233,245, filed November 14, 1927, for patent upon Automobile cleaning systems.

The primary object of the present invention is the provision of means that will permit of the rapid handling of automobiles while in slow transit and while the automobiles to be treated are so arranged with respect to one another that they may be progressively presented to laborers or operatives during the different stages of the washing, cleaning and possibly the polishing of such automobiles, and the arrangement of a means or mechanism which will permit automobiles to be rapidly and progressively conducted to a point where they may proceed over a course the area of which is calculated to allow for a complete treatment of an automobile during the interval from its receipt in the course to the time that the treated automobile is discharged or deviated therefrom.

A further object of the invention is to provide a compact arrangement of respective mechanisms which will handle a large number of automobiles within a space of minimum proportion and with speed, low expense and thoroughness.

A further object of the invention is to provide a mechanism which will operate to cause translation of a series of automobiles along a fixed or defined course, while holding the automobiles relatively spaced apart so as to avoid any accidental or damaging thrusting of one automobile against another in the series, while providing a working space between adjacent automobiles of the series for the accommodation of the laborers or operatives while the automobiles are undergoing treatment.

A still further object of the invention is to provide a compact mechanism characterized by a course over which automobiles to be treated can be moved and means provided within the boundary of the said course whereby automobiles can be selectively deflected from the course and presented to a point where the work of greasing, of lubricating or repairing mechanical parts of the automobile can be conducted.

In the accompanying drawing.

In carrying the invention into practice, use is made of a stationary platform 5 on which automobiles are adapted to be received and moved. This platform is in the nature of a concrete foundation or floor of a building 6, preferably of rectangular design in horizontal section, and as illustrated the said platform is provided with concentrically spaced apart wheel guides 7 and 8 against which the wheels of an automobile may ride in contact, so as to guide the automobile over a defined course. In the present instance, and from the fact that the wheel guides 7 and 8 are in concentric relation with respect to each other, the course established for the passage of automobiles under treatment is circular. I, however, do not wish to be limited in this respect and have illustrated a circular form because of the extreme convenience which it provides for the quick handling of automobiles. It will be understood that the space between the aforementioned wheel guides 7 and 8 is so calculated that it will accommodate the running gear of an automobile positioned upon the course so as to dispose the wheels thereof in relatively close proximity to the respective guides. These guides, therefore, serve to define the course over which the automobiles are to be drawn and to prevent deflection of the automobiles from the course.

Figure 2:
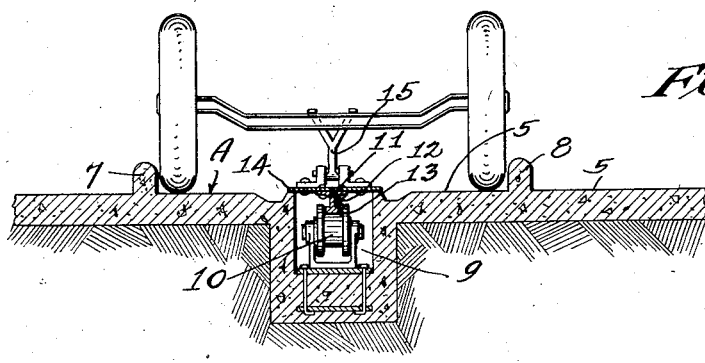
Figure 2 is an enlarged section taken substantially on the line 2—2 of Figure 1.
Figure 3:
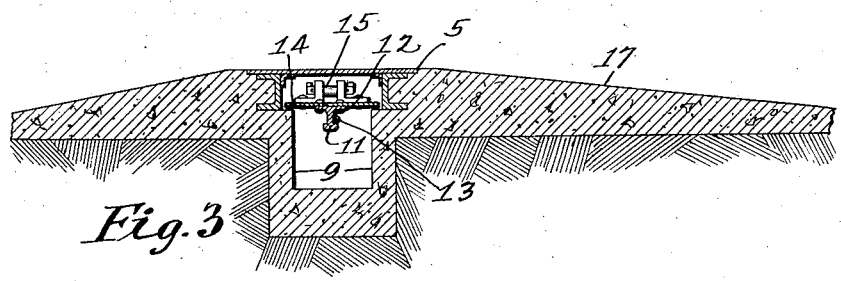
Figure 3 is a transverse section taken substantially on the line 3—3 of Figure 1.

The platform 5 is formed with a trench 9 which is medially positioned with respect to the two concentric guides 7 and 8. Within the trench are placed as many idler pulleys 10 as may be found sufficient to sustain a calculated load and which are further intended as a means for reducing friction between co-acting moving parts of my mechanism. Superposed with respect to these idlers is a pulley or circular T-shaped rail 11 having a base portion or head which freely rests upon the idlers. This pulley or rail is formed at one side with a groove 12 around which is trained a cable 13. Welded or otherwise secured to the said pulley or rail 11 is a circular steel plate 14 which slightly clears the upper surface of the platform 5 so as to avoid friction. Supported by the said plate 14 are pivoted grab or conveyer hooks 15 which are capable of being tilted in an upward direction manually so as to engage with the axle of an automobile as conventionally illustrated in Figure 2. The said steel plate 14 is concentrically disposed with respect to the aforementioned guides 7 and 8, and the plate is of a width so as to expose surfaces A and B, respectively, of the platform over which the wheels of an automobile may freely travel.

Therefore, these surfaces A and B are so positioned that they co-act with the guides 7 and 8 to assist the latter in an intended translation of automobiles along a defined path. The said hooks 15 are spaced apart relatively so that they may be respectively engaged with automobiles when the latter are in circular series formation and the distance between the adjacent hooks is such that there will be a clearance between the front end of one automobile and the rear end of adjacent automobile, thus preventing the thrusting of one automobile with any damaging effect against another while they are being translated, while further providing ample working space between adjacent automobiles for the accommodation of a laborer in his movement from one side of the platform to another or while the laborer is operating upon either the front end or the rear end of a car under treatment.

At one point in the circular course which I have above referred to is a combined entrance and exit gangway, preferably formed of the same material as the platform 5, and as illustrated this gangway has an upwardly inclined section 17 which is appreciably wider at its lowest end so as to facilitate the entrance of automobiles desiring to enter the course and to permit automobiles from one side of the gangway to proceed in an entering direction while the opposite side of the course may be utilized for the accommodation of automobiles seeking an exit. This gangway traverses the course and within the circle described by the inner guide 7 the said gangway inclines downward against the platform 5 and as illustrated it is flared so that it is wider at its base than at that point where it approaches the terminus of the surface A.

Within the building 6 is conventionally illustrated a power plant 18 which embodies the endless driven cable 13 aforementioned which is trained through the groove 12 of the pulley or rail 11 and, as illustrated, it passes from the power plant over an idler 19 where it extends for a slight distance on a line tangential to the course over which the automobiles are to be taken, following the trench 9, which latter terminates at intersecting points at the power plant, the cable then returning to the power plant on a line also tangential to the said course and being intercepted by the action of a gravity take-up mechanism 20, which holds the cable in a relatively tight condition while making the circuit and which also functions to retain the cable within the groove 12 of the pulley 11.

Figure 1:
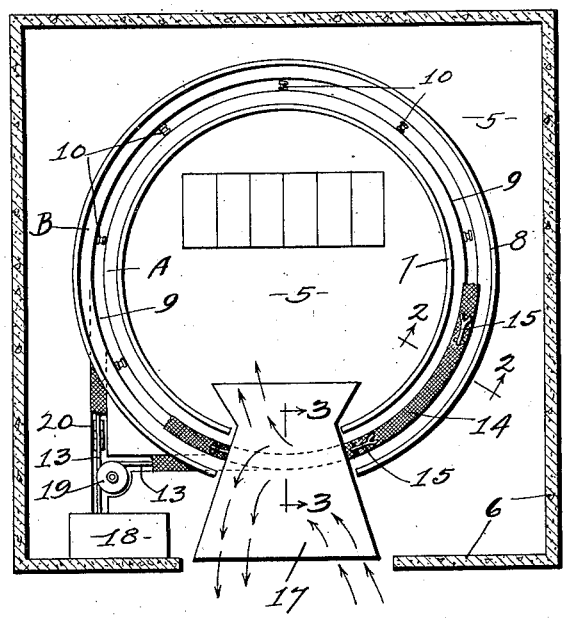
Figure 1 is a plan view of my improved rack or laundry with parts in section and parts broken away for the purpose of clearness.

Having described the essential structural features of the invention, it manifestly follows that automobiles may be driven into the course by their own motive power, so that they may be progressively positioned at the left side of the gangway where it approaches the course. As the automobiles progressively are advanced to this position their axles are associated with the hooks 15 so that the automobiles will be drawn in a direction toward the left initially and then subsequently follow around the course until they approach the right hand end of the gangway at which time the hooks 15 are released from the axles and the cars proceed to take exit paths along the lines indicated by the arrows designated "out" in Figure 1. Instead of driving or guiding the cars from the course to the exit point of the gangway 16, the cars may be deflected into the space defined by the inner guide 7 wherein grease or lubricating racks may be provided upon which automobiles to be lubricated can be mounted.

It will be understood that when the cars are positioned upon the course the draft cable 13 is placed in slow motion. It will be further appreciated that the diameter of the circular course herein described is calculated with respect to the speed imparted to the draft cable and with respect to the number of operatives operating upon the cars in the course, so as to allow for the complete cleaning of an automobile in one complete cycle thereof over the course. I find that the mechanism which I have herein provided will allow for the quick handling of automobiles and the thorough treatment thereof in a minimum space of time and with thoroughness and slight expense.

I claim:

1. A stationary platform on which automobiles are adapted to be received and moved, guide means on the platform for causing automobiles to be moved over a defined course upon the platform, draft means following the defined course, means carried by the draft means adapted to be detachably associated with the automobiles so as to hold them in definite spaced relation to each other while positioned along the course, means for operating the draft means, and a gangway traversing the course, and co-operable therewith to enable automobiles to be successively moved thereover and to enter said course and to be subsequently conducted from the course by way of said gangway.

2. A stationary platform on which automobiles are adapted to be received and moved, means for defining a course upon the platform to be traversed by automobiles during the period of translation thereof, draft means following the outline of the course, mechanism for driving the draft means, the platform having a portion within the boundary of the course and a portion exterior of the boundary of the course, and a gangway connecting the latter portion of the platform with the former portion thereof and traversing the course so that automobiles may be driven from the exterior portion of the platform to a position within the course and from the latter over the gangway to the portion of the platform exterior of the boundary of the course.

3. A platform on which automobiles are adapted to be received and moved, concentric spaced apart guides rising from the platform and defining a course between which said guides the wheels of an automobile may be disposed so as to guide the automobile in the interval of translating the same along the course, means positioned in concentric relation to the guides and provided with devices adapted to engage with the axles of automobiles, whereby to hold automobiles in row formation, with one automobile spaced from the other throughout the series, the last means adapted to be placed in continuous motion, mechanism for driving the said means, and means to permit automobiles to be inducted to and to substantially traverse the course and to be thence conducted from the course.

4. In an apparatus for use in the cleaning and polishing of automobiles, a stationary platform on which automobiles are adapted to be received and moved, means to permit automobiles to be respectively run onto and off of the platform, mechanism for moving the automobiles on the platform, and means on the platform for definitely guiding the automobiles during movement thereof.

5. In an apparatus as embodied in claim 4 wherein said mechanism is detachably associated with the automobiles and when attached holds them in definite spaced relation to each other.

6. A vehicle washing system comprising a runway for vehicles, longitudinal guides in said runway adapted to maintain vehicles thereon, a continuous power imparting means positioned between said guides, means for causing movement of said power imparting means in the direction of travel of vehicles thereon and means for operatively connecting said power imparting means with vehicles to move them along said runway.

ALBERT A. SMALLHOUSE.